United States Patent [19]
Krude et al.

[11] Patent Number: 5,616,081
[45] Date of Patent: Apr. 1, 1997

[54] CONSTANT VELOCITY UNIVERSAL BALL JOINT WITH CO-AXIAL INSERTABLE INNER JOINT MEMBER

[75] Inventors: Werner Krude, Neunkirchen-Wolperath; Peter Harz, Hennef, both of Germany; Bruno Feichter, Bruneck, Italy

[73] Assignees: GKN Automotive AG, Lohmar, Germany; GKN Birfield SpA, Bruneck, Italy

[21] Appl. No.: 358,182

[22] Filed: Dec. 16, 1994

[30] Foreign Application Priority Data

Dec. 17, 1993 [IT] Italy ................. MI93A2661

[51] Int. Cl.$^6$ .............................................. F16D 3/224
[52] U.S. Cl. .............................. 464/145; 464/906
[58] Field of Search ........................... 464/144, 145, 464/146, 906

[56] References Cited

U.S. PATENT DOCUMENTS

| | | | |
|---|---|---|---|
| 4,533,339 | 8/1985 | Girguis | 464/146 |
| 4,589,857 | 5/1986 | Okoshi | 464/906 X |
| 4,915,672 | 4/1990 | Girguis | 464/145 |
| 5,106,343 | 4/1992 | Sakaguchi et al. | 464/906 X |
| 5,167,584 | 12/1992 | Krude | 464/145 |
| 5,288,273 | 2/1994 | Krude | 464/906 X |
| 5,290,203 | 3/1994 | Krude | 464/906 X |
| 5,433,668 | 7/1995 | Hartz et al. | 464/906 X |
| 5,451,185 | 9/1995 | Krude et al. | 464/906 X |
| 5,453,052 | 9/1995 | Hartz et al. | 464/906 X |

FOREIGN PATENT DOCUMENTS

| | | |
|---|---|---|
| 2323822 | 5/1974 | Germany . |
| 2252827C3 | 1/1976 | Germany . |
| 2531009B1 | 2/1976 | Germany . |
| 2606752C2 | 9/1984 | Germany . |
| 4303901A1 | 10/1993 | Germany . |
| 4211170 | 10/1993 | Germany ................ 464/145 |
| 3277822 | 3/1990 | Japan . |
| 2-17730 | 4/1990 | Japan . |
| 3-117726 | 5/1991 | Japan . |
| 3-29621 | 6/1991 | Japan . |
| WO9316296 | 8/1993 | WIPO . |

*Primary Examiner*—Daniel P. Stodola
*Assistant Examiner*—Eileen A. Dunn
*Attorney, Agent, or Firm*—Harness, Dickey & Pierce, P.L.C.

[57] ABSTRACT

A constant velocity universal ball joint has an outer joint part, an inner joint part and torque transmitting balls held in a cage. The cage has centers of curvature ($M_1$, $M_2$) of the outer spherical face (14, 44) and of an inner spherical face (14, 44) of the ball cage (4, 34) which are axially offset relative to a central cage plane (E), defined by the circumferentially extending center lines ($L_m$) of the cage windows (12, 42). The center of curvature ($M_1$) of the outer spherical face (13, 43) is positioned towards the aperture (8, 38) in the outer joint part (2, 32), and the center of curvature ($M_2$) of the inner spherical face, (14, 44), is positioned towards the end of the outer joint part (2, 32) located axially opposite the aperture (8, 38). The diameter of the inner aperture (15, 45) of the ball cage (4, 34), which is positioned towards the aperture (8, 38) of the outer joint part (2, 32), is greater than the greatest outer diameter of the surface (19, 49) of the inner joint part (3, 43).

13 Claims, 8 Drawing Sheets

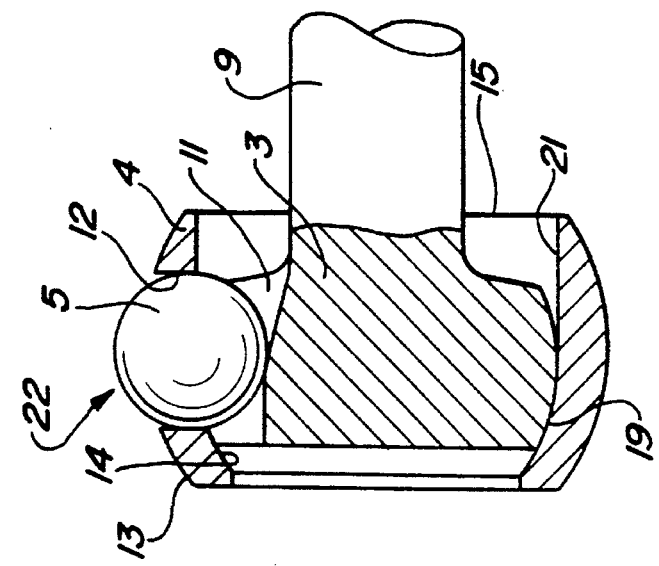
_Fig-2A_
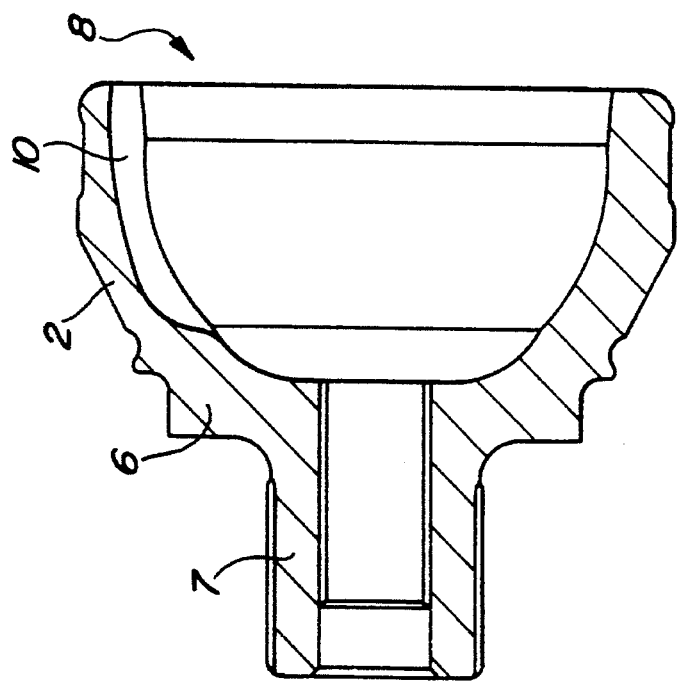
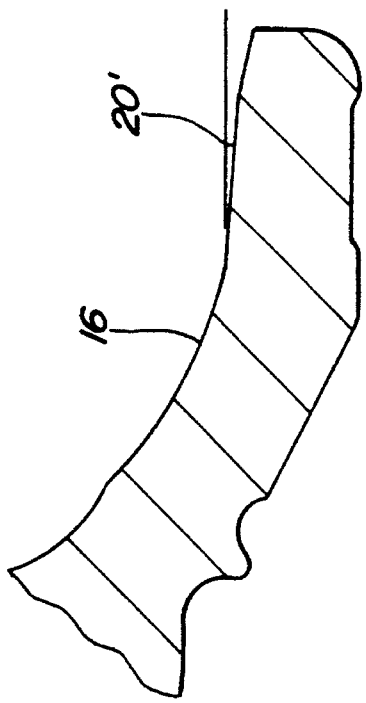
_Fig-2B_

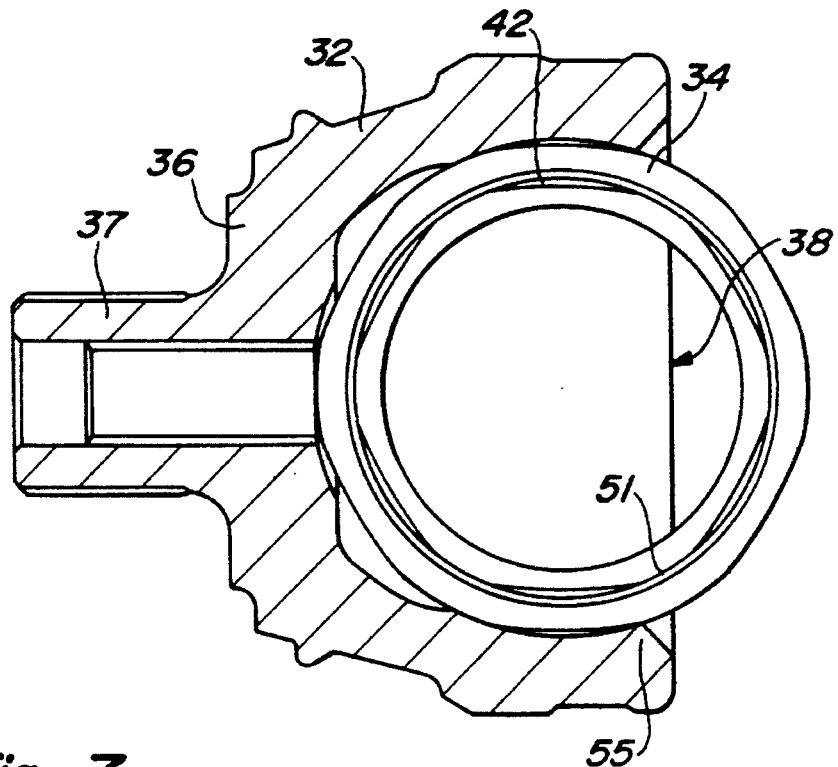
_Fig-7_
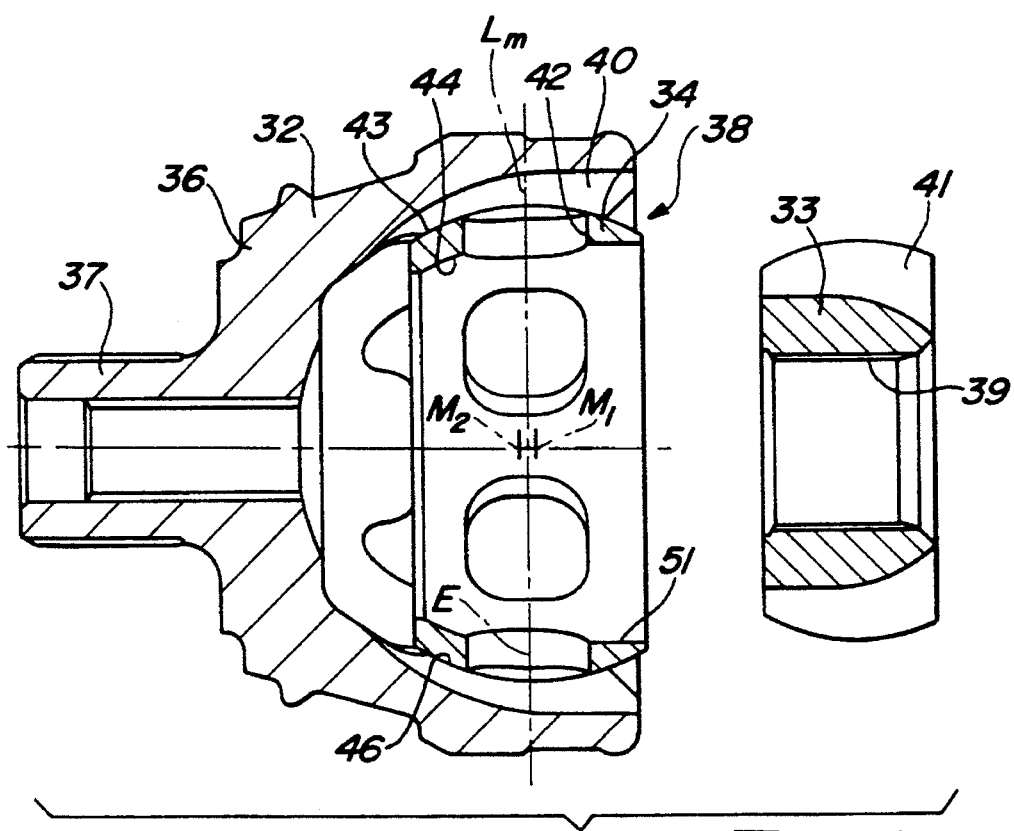
_Fig-8_

CONSTANT VELOCITY UNIVERSAL BALL JOINT WITH CO-AXIAL INSERTABLE INNER JOINT MEMBER

BACKGROUND OF THE INVENTION

The present invention relates to a constant velocity universal ball joint having an outer joint part, with longitudinally extending internally circumferentially distributed first ball tracks, and an inner joint part with longitudinally extending externally circumferentially distributed second ball tracks. One first ball track and one second ball track each are arranged so as to be radially opposed. The outer joint part, at least at one end, includes an aperture for the drive means of the inner joint part. Torque transmitting balls are guided in each first and second ball track. An annular ball cage, which is positioned in an annular space between the outer joint part and the inner joint part, includes circumferentially distributed cage windows, each axially holding a ball. The ball cage holds all the balls in one common plane and when the axes of the outer joint part and of the inner joint part are articulated, guides the balls onto the angle-bisecting plane of same axes. The cage includes an outer spherical cage face, which is in guiding contact with a guiding face associated with the outer joint part, and an inner spherical cage face which is in guiding contact with a surface of the inner joint part.

Joints of this type are shown in DE-PS 22 52 827. As a rule, the outer joint part, at its driving end located axially opposite the drive end for the inner joint part, is closed by an integrally formed on base part. There are also prior art embodiments where such a base part is welded to the outer joint part. As a rule, a shaft journal is formed on or attached to the base part. The joints may be provided in the form of UF joints (undercut-free) with axially undercut-free ball tracks or as RF joints (Rzeppa fixed joints) whose ball tracks are curved on both sides of the central plane.

Joints of the above-mentioned type are complicated and disadvantageous as far as assembly is concerned. Initially, it is difficult to introduce the inner joint part into the cage with axes arranged perpendicularly relative to one another. It is equally complicated to introduce the cage into the outer joint part, again with the respective axes intersecting one another substantially at right angles, with parts of the cage engaging the tracks of the outer joint part and with parts of the outer joint part engaging the windows of the cage.

Only after the inner joint part, cage and outer joint part have been arranged inside one another, so as to be positioned substantially coaxially relative to one another, is it possible to fit the balls. Here the inner joint part, the cage and the outer joint part are moved into an individual angular position for each ball to enable the ball to be introduced radially into a cage window projecting from the outer joint part. To permit such an angular position referred to as "over-articulation" which, under normal joint operating conditions, is neither necessary nor permissible, the cage windows include a certain circumferential length which again is not required for standard operating conditions. As a result, the strength of the cage is reduced.

SUMMARY OF THE INVENTION

It is an object of the invention to provide a joint of the initially mentioned type whose assembly is simplified and has improved cage strength. The objective is achieved in that the centers of curvature $M_1$, $M_2$ of the outer spherical face and of the inner spherical face of the ball cage are axially offset relative to a central cage plane E defined by the circumferentially extending center lines $L_m$ of the cage windows. The center of curvature $M_1$ of the outer spherical face is positioned towards the aperture in the outer joint part and the center of curvature $M_2$ of the inner spherical face is positioned towards the end of the outer joint part located axially opposite the aperture. The diameter of the inner aperture of the ball cage, which is positioned towards the aperture of the outer joint part, is greater than the greatest outer diameter of the surface of the inner joint part.

In this way, a joint is provided wherein the inner joint part may be introduced coaxially into the ball cage without the need for pivotal movements and mutual engagement in ball tracks or cage windows. In consequence, this process is simplified for both manual and automatic modes of operation. Only in this way is it possible to introduce automation without incurring unacceptable expenditure.

Furthermore, the production of the cage is simplified as far as its inner cage face is concerned, which is undercut-free, so that this face can easily be produced by applying a non-chip-producing forming method.

In spite of the at one end enlarged inner aperture, the ball cage embodiment in accordance with the invention does not adversely affect the strength values because, as a result of the offset of the centers of curvature of the cage surfaces, the wall thickness of the ball cage is not greatly reduced.

According to a preferred embodiment, achieving further assembly and strength advantages, the inner face of the outer joint part, if viewed from the aperture, is axially undercut-free and the first guiding faces are provided therein for the cage at the end located opposite the aperture and the second guiding faces for the cage are provided at the end located towards the aperture at one or more separate securing elements which are each connected to the outer joint part.

According to an alternative embodiment, which achieves the same assembly and strength advantages, the inner face of the outer joint part, if viewed from the aperture, is axially undercut-free and is at a distance from the outer cage face at the end located opposite the aperture when the balls are in contact with the ball tracks and their cage windows, and the guiding faces for the cage, at the end located towards the aperture, are provided with one or more separate securing elements which are each connected to the outer joint part.

In both cases it is possible for a pre-assembled unit including the ball cage and inner joint part, whose assembly is already simplified in accordance with the invention, to be inserted coaxially into the outer joint part. After this entirely axial assembly operation, the unit is then secured by at least one or more securing elements which are also introduced axially. The securing elements may be connected to the outer joint part by welding, clamping or caulking.

If the ball tracks are also axially undercut-free, the pre-assembled unit including the ball cage and inner joint part may be assembled together with the balls already inserted into the cage windows and the second ball tracks. This assembly operation, too, is greatly simplified as compared to previously common assembly sequences and is easier to be carried out, either manually or automatically. Only in this way is it possible to introduce automation without incurring unacceptable expenditure.

According to a first embodiment, axial introduction of the pre-assembled unit may be limited by contact between the spherical outer face of the cage and the inner face of the outer joint part. After the faces have contacted one another, the securing elements are inserted into the outer joint part and their guiding faces may be made to contact the spherical outer face of the cage. In this position, they are connected to the outer joint part.

It is also possible to deviate from the above where the balls come into contact with the first and second ball tracks and are supported on the flanks of their cage windows before the spherical outer face of the cage stops against the inner face of the outer joint part. Thereafter, the securing elements may again be inserted into the outer joint part, with their guiding faces made to stop against the spherical outer face of the cage. In this position, they are connected to the outer joint part.

Whereas above it is explained that the connection between the securing elements and the outer joint part should be effected in a play-free position, it is also possible to use the play-free position as a reference position only. After reaching the reference position and prior to connecting the securing elements to the outer joint part, the inner joint part is extracted by a fixed predetermined amount from the outer joint part in order to achieve a predetermined play value in the joint. Because of the assembly operation as described, the play value is always the same, irrespective of the production tolerances at the individual components because it refers to the play-free condition actually occurring at the components which have been joined together. Such defined identical play values are very advantageous from the point of view of the joint service life.

The radius of curvature of the inner face of the outer joint part and of the surface parts of the securing elements coming into contact with the cage may correspond to that of the outer guiding face of the cage. However, it is also possible to increase the radii of curvature of the faces, which, in particular, may be changed into conical faces.

According to a further advantageous embodiment, the axially undercut-free inner face of the outer joint part extends cylindrically approximately from the central plane of the cage of the assembled joint towards the aperture.

According to a further embodiment, the undercut-free inner face of the outer joint part expands conically from the central plane through the balls of the assembled joint towards the aperture. This simplifies the production of the outer joint part for example in that it may be produced by a non-chip-producing forming operation.

According to a further advantageous embodiment, a driveshaft is integrally formed onto the inner joint part. In view of the assembly procedure in accordance with the invention, the diameter of the driveshaft is not limited by the assembly angle of articulation required for fitting the balls, but only by the operational angle of articulation. In view of the purely axial assembly procedure which no longer makes it necessary for the joint to be over-articulated to allow the individual balls to be introduced into the cage windows, the shaft may be correspondingly thicker.

In a further advantageous embodiment of the invention, the circumferential length of the cage windows is limited to the dimension required for the operating angle of the joint. Again, there is no need to take into account joint over-articulation for assembly purposes or of the cage windows projecting from the outer joint part. On the contrary, the strength of the cage is increased by reducing the size of the cage windows in the circumferential direction.

From the following detailed description, accompanying drawings and subjoined claims, other objects and advantages will become apparent to those skilled in the art.

BRIEF DESCRIPTION OF THE DRAWINGS

Preferred embodiments of the invention will be described below with reference to the drawings wherein:

FIG. 2A is a view like FIG. 2 of an additional embodiment of the present invention.

FIG. 7 is a sectional and plan view of an outer joint part and a ball cage of a joint according to FIG. 5 during assembly.

FIG. 8 is a partially exploded sectional view of a pre-assembled unit including the outer joint part and ball cage as well as an inner joint part according to FIG. 5 prior to assembly.

DETAILED DESCRIPTION OF THE PREFERRED EMBODIMENT

Figure 1:
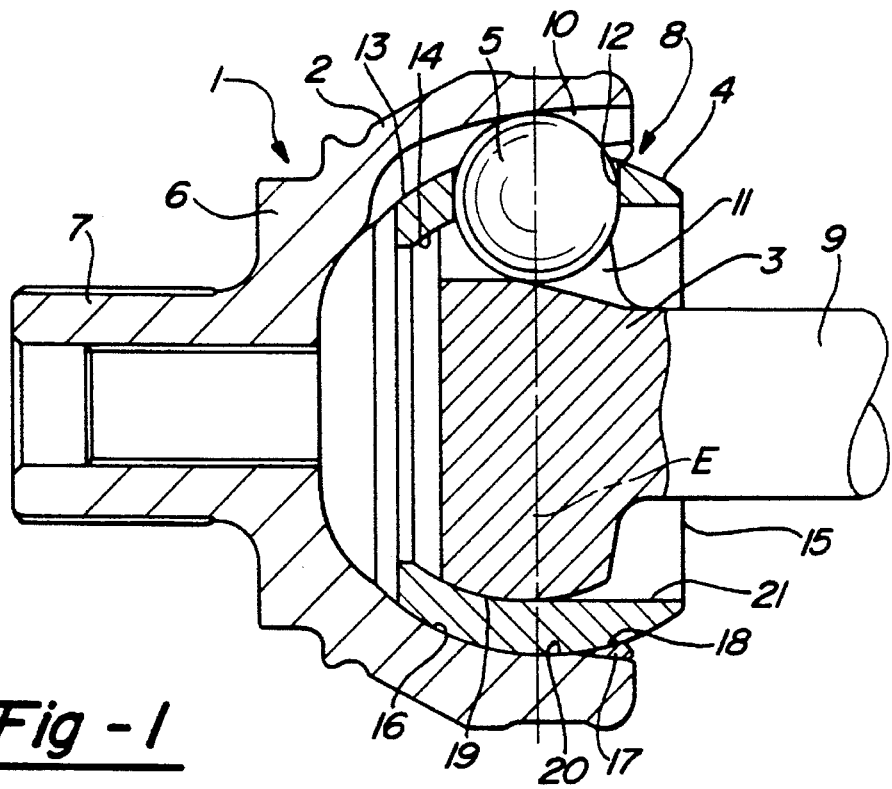
FIG. 1 is a longitudinal section view of a first embodiment of a finish-assembled constant velocity universal ball joint in accordance with the invention (UF joint).

FIG. 1 illustrates a constant velocity universal ball joint 1 including an outer joint part 2, an inner joint part 3, a ball cage 4 arranged in an annular space (without a reference number) between the two joint parts, and a plurality of circumferentially distributed balls 5. On one side, the outer joint part 2 is closed in a dish-like way by a base 6, with a hollow journal 7. An aperture 8 is formed at the drive end of the outer joint part 2. A shaft journal 9 used for driving purposes is attached to the inner joint part 3 so as to be integral therewith. The outer joint part 2 is provided with first ball tracks 10 which, if viewed from the aperture 8, are axially undercut-free. The inner joint part 3 is provided with second ball tracks 11 which, if viewed from the aperture 8, are also axially undercut-free.

Torque transmitting balls 5 are each accommodated in a pair of radially opposed first and second ball tracks 10, 11. The balls 5 are each axially held in a cage window 12 of the ball cage 4.

The ball cage 4 includes an outer spherical cage face 13 which is in contact with the outer joint part 2, and an inner spherical cage face 14 which is in contact with the inner joint part 3. The diameter of the inner aperture 15 of the ball cage 4, positioned towards the input end of the inner joint part 3, is greater than or equal to the greatest diameter of the inner joint part 3. The ball cage 4 is supported in the outer joint part 2 by means of its spherical guiding face 16 which is undercut-free at least from the central plane E of the ball cage 4 through the ball centers towards the aperture 8.

Securing elements 17, with inner guiding faces 18 are inserted into the outer joint part 2 to axially secure the ball cage 4. The ball cage 4 includes an inner spherical cage face 14 against which the inner joint part 3 is supported. At least from the central plane through the longitudinal center lines $L_m$ of the cage windows of the ball cage 4, the inner cage face 14, too, if viewed from the drive end of the inner joint part 3, is axially undercut-free. The reference number 20 refers to an undercut-free, slightly conical portion in the outer joint part 2. The undercut-free inner cylindrical portion on the inside of the ball cage 4 has been given the reference number 21.

Figure 1A:
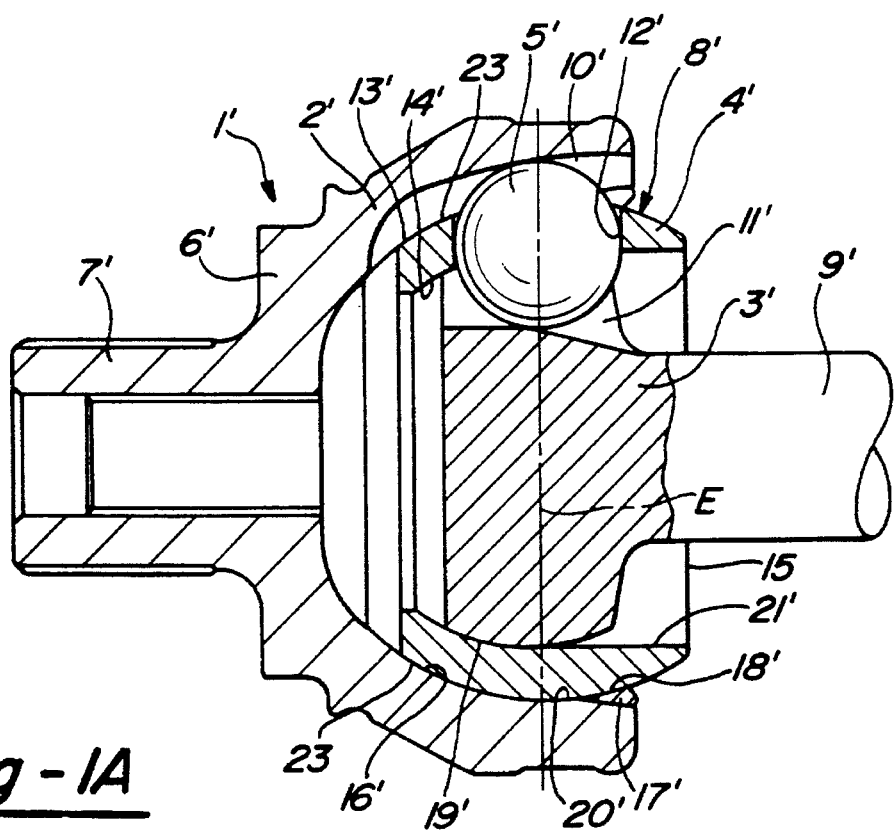
FIG. 1a is a longitudinal section view of a first modification of the embodiment according to FIG. 1 of a finish-assembled constant velocity universal ball joint in accordance with the invention.

In FIG. 1a, any details corresponding to those shown in FIG. 1 have been given the same reference numbers followed by the index '. To the extent that any details are not specially referred to, reference is made to the description of FIG. 1. FIG. 1a deviates from FIG. 1 in that, between the spherical outer face 13' of the cage and the inner face 16' of the outer joint part, a gap 23 exists at the end positioned towards the base 6'. The cage 4' is supported in the direction of the base 6' through the cage window 12' on the balls 5' which, in turn, is supported on the base of the first ball tracks 10' in the outer joint part 2'. On the other hand, the spherical outer face 13', towards the driveshaft 9', is in contact with the guiding faces 18' of the securing elements 17'.

Figure 1B:
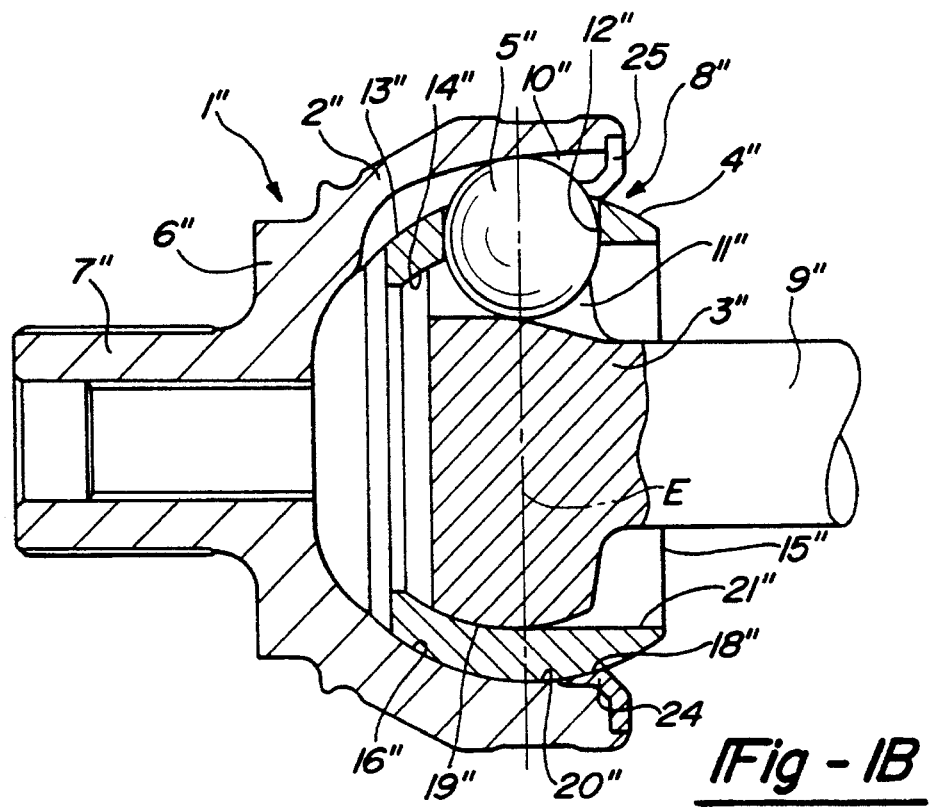
FIG. 1b is a longitudinal section view of a second modification of the embodiment according to FIG. 1 of a finish-assembled constant velocity universal ball joint in accordance with the invention.

In FIG. 1b, any details corresponding to those shown in FIG. 1 have been given the same reference numbers followed by the index ". To the extent that any details are not specially referred to, reference is made to the contents of the description of FIG. 1. As in FIG. 1, the spherical outer face 13" of the cage 4" is in contact with the inner spherical face 16" of the outer joint part 2". The modification is provided in the form of a single annular securing element 24 which is produced of plate metal and which, in the region of the ball tracks 10", includes punched-out regions 25 with the same contours. In this case, too, the securing element 24 includes guiding faces 18" which have established a supporting contact with the spherical outer face 13" of the cage 4" in the direction of the shaft 9".

Figure 2:
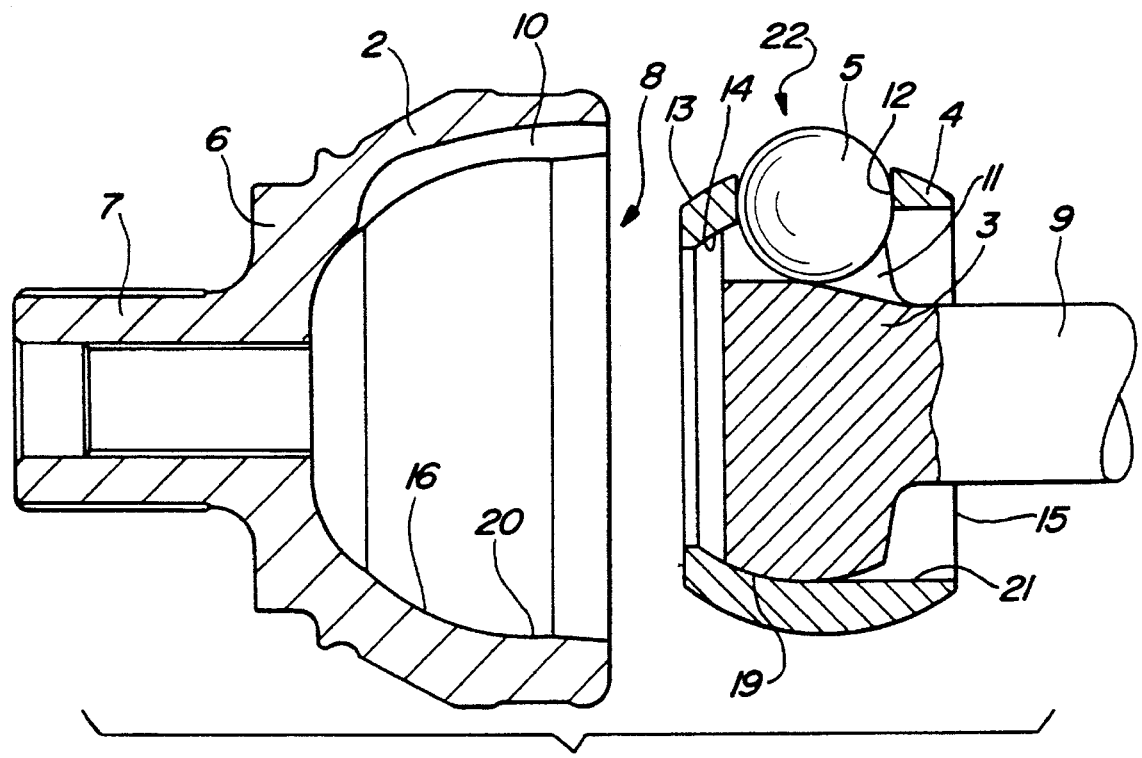
FIG. 2 is a partially exploded longitudinal section view of a joint according to FIG. 1 prior to introducing a unit including the inner joint part, ball cage and balls into the outer joint part.
Figure 3:
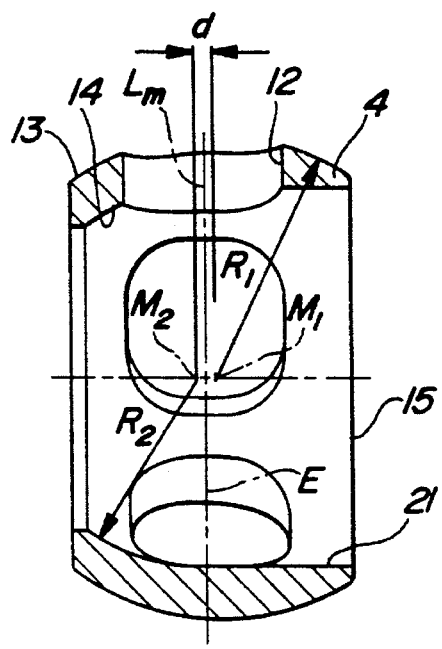
FIG. 3 is a section view of a ball cage of a joint in accordance with the invention.
Figure 4:
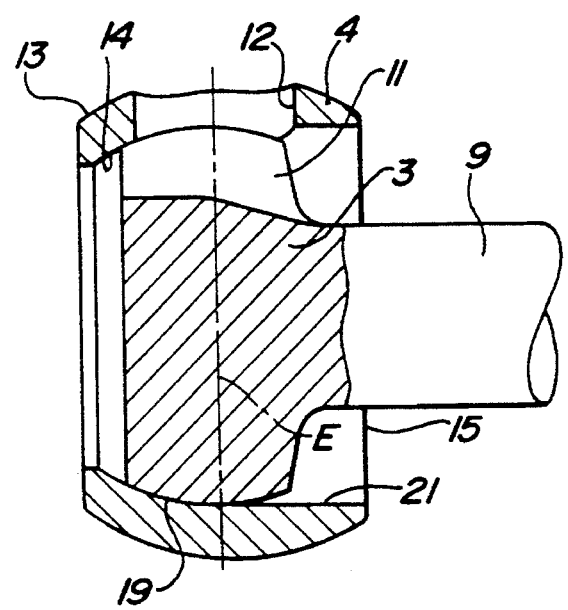
FIG. 4 is a partial section view of a pre-assembled unit including the ball cage and inner joint part of a joint in accordance with the invention as illustrated in FIGS. 1 and 2.

In FIGS. 2 to 4, any details corresponding to those of FIG. 1 have been given the same reference numbers. To the extent that they are not referred to again, reference is made to the contents of the description of FIG. 1.

FIG. 2, on the lefthand side, shows the outer joint part 2 in the form of a detail in a longitudinal section. On the righthand side, a pre-assembled unit 22 is illustrated including the inner joint part 3, the ball cage 4 and the balls 5. Because of the size of the inner aperture 15 and the design of the inner face 21 at the ball cage 4, it is possible to introduce the inner joint part 3 coaxially into the ball cage 4 until the spherical surface 19 of the inner joint part 3 comes to rest against the inner spherical face 14 of the ball cage 4. It is possible to insert the two parts into one another coaxially and without carrying out a pivotal movement. It is only thereafter that the balls 5 are introduced radially into the cage windows 12 from the outside. The outer joint part 2 is shown in a preferred embodiment where the inner face 16, if viewed from the aperture 8, has an axially undercut-free surface 20 which extends cylindrically approximately from the central plane of the cage, which, as indicated by the arrow, enables the pre-assembled unit 22, as illustrated on the right, to be introduced entirely axially into the outer joint part 2.

Also, as seen in FIG. 2A, the outer part 2 has an axially undercut-free surface 20' which extends conically approximately from the central plane of the cage.

Depending on the dimensions, the axial introducing operation is limited by the spherical outer face 13 of the ball cage 4 stopping against the inner face 16 or by the balls 5 moving along the cage windows 12 stopping against both the first ball tracks 10 and the second ball tracks 11. Axial pressure is applied to the cage 4 as a result of the contact between the surface 19 of the inner joint part 3 and the inner spherical face 14 of the cage 4. As in the case of the embodiment illustrated in FIG. 1, direct contact is established between the outer face 13 of the ball cage 4 and the inner face 16 of the outer joint part 2.

FIG. 3 is half a section through the cage 4, and shows several of the circumferentially distributed cage windows 12. Circumferentially extending center lines $L_m$ are shown which are at a uniform distance from the flanks axially delimiting the cage windows 12 and which define the central plane E of the cage 4. Furthermore, FIG. 3 shows the center $M_1$ of the radius of curvature $R_1$ of the outer face 13 and the center $M_2$ of the radius of curvature $R_2$ of the inner face 14. The two centers $M_1$, $M_2$ are axially offset in opposite directions relative to the central plane E, with their axial distance given by the dimension d.

FIG. 4 again shows the pre-assembled unit 22 including the inner joint part 3 and the ball cage 4 as already shown in FIG. 2, but in this case, the balls have not yet been fitted.

Figure 5:
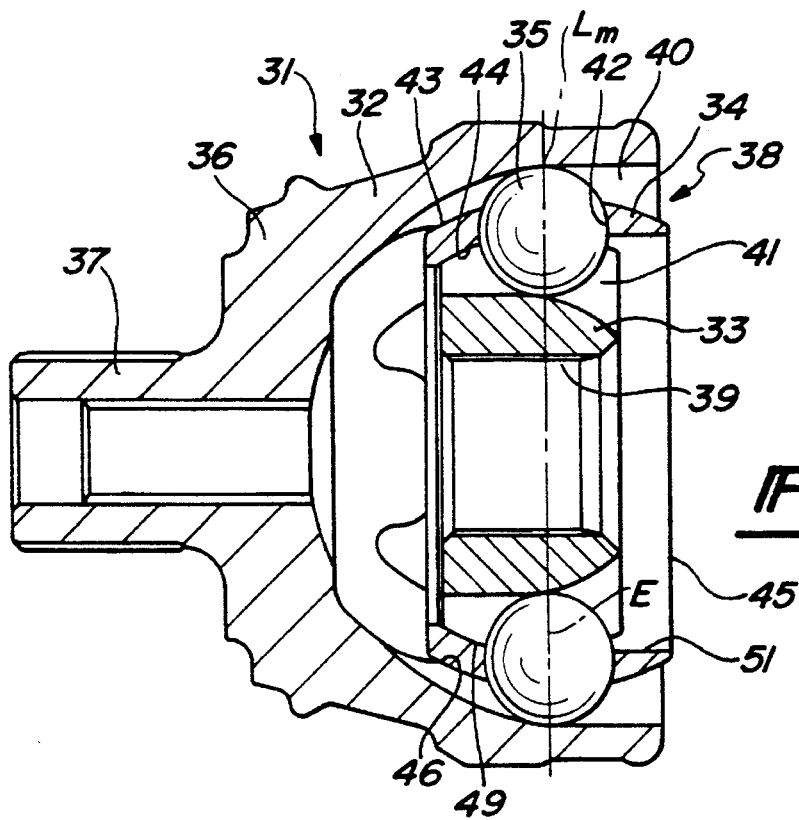
FIG. 5 is a longitudinal section view of a second embodiment of a finish-assembled constant velocity universal ball joint in accordance with the invention (UF joint).

FIG. 5 shows a UF constant velocity universal ball joint 31 including an outer joint part 32, an inner joint part 33, a ball cage 34 arranged in an annular space (without a reference number) between the two joint parts, and a plurality of circumferentially distributed balls 35. On one side, the outer joint part 32 is closed in a dish-like way by a base 36 which is followed by a hollow journal 37. An aperture 38 is at the drive end of the outer joint part 32. The inner joint part 33 includes a toothed plug-in aperture 39 for a shaft journal. The outer joint part 32 includes first ball tracks 40 which, if viewed from the aperture 38, are axially undercut-free. The inner joint part 33 includes second ball tracks 41 which, if viewed from the aperture 38, are also axially undercut-free.

Torque transmitting balls 35 are each accommodated in a pair of radially opposed first and second ball tracks 40, 41. The balls 35 are each axially held in a cage window 42 of the ball cage 34.

The ball cage 34 includes an outer spherical cage face 43, which is in contact with the outer joint part 32, and an inner spherical cage face 44 which is in contact with the inner joint part 33. The diameter of the inner aperture 45 of the ball cage 34 positioned towards the drive end of the inner joint part 33 is greater than/equal to the greatest diameter of the inner joint part 33. In both axial directions, the ball cage 34 is supported on a spherical guiding face 46 in the outer joint part 32 which, relative to the central plane E of the ball cage 34 through the ball centers, is asymmetrically offset towards the aperture 38. The ball cage 34 includes an inner spherical cage face 44 against which the inner joint part 33 is supported. It is asymmetrically offset relative to the central plane E of the ball cage 34 through the ball centers towards the base 36. At least from the central plane E of the ball cage 34, defined by the longitudinal center lines $L_m$ of the cage windows, the inner cage face 44, if viewed from the drive end of the inner joint part 33, is undercut-free. The undercut-free inner cylindrical portion on the inside of the ball cage 34 has been given the reference number 51.

In FIGS. 6 to 9, any details corresponding to those shown in FIG. 5 have been given the same reference numbers. To the extent that they are not mentioned individually, reference is made to the description of FIG. 5.

Figure 6:
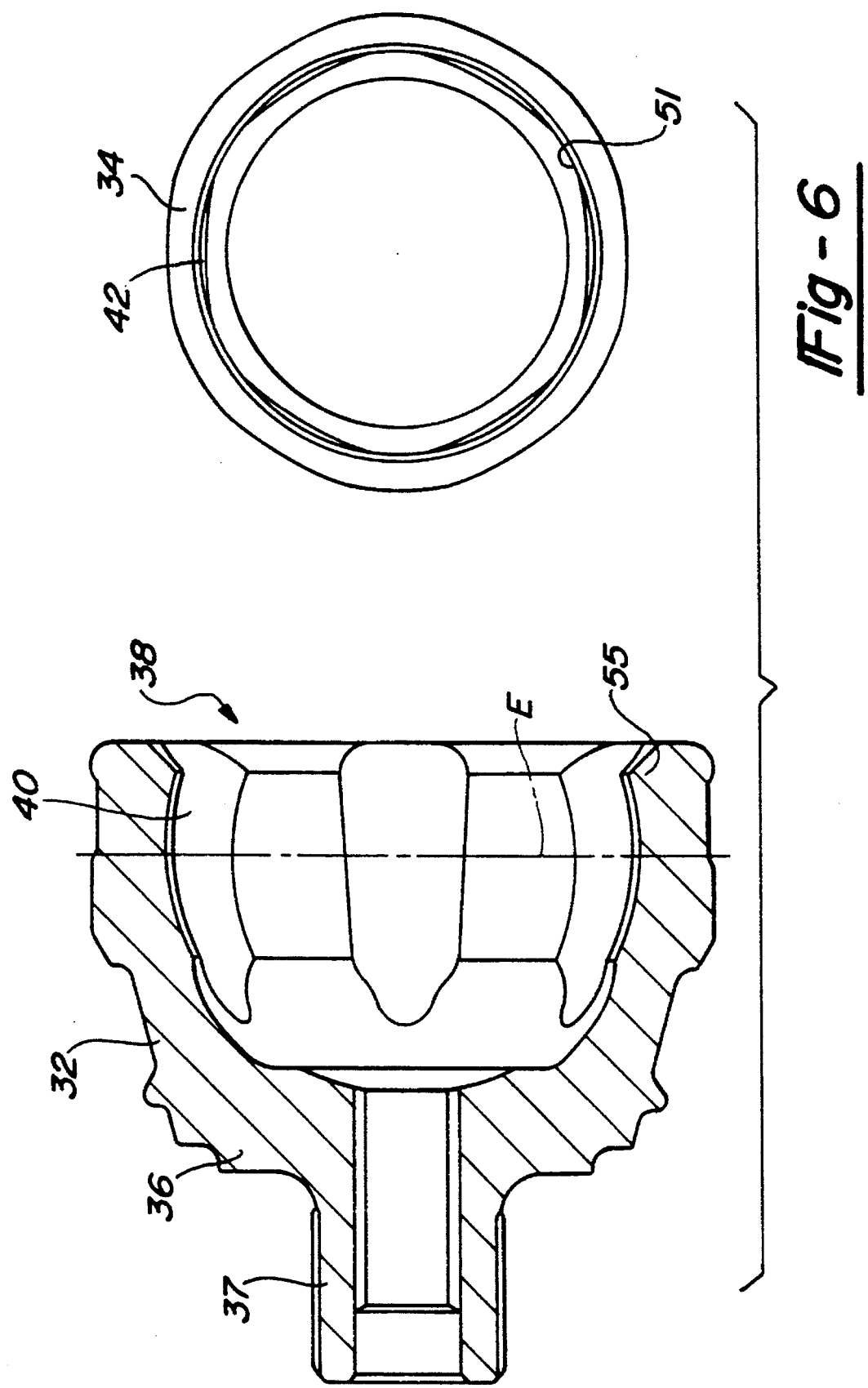
FIG. 6 is an exploded sectional and plan view of an outer joint part and a ball cage of a joint according to FIG. 5 prior to being assembled.

FIG. 6 shows the outer joint part 32 and the ball cage 34 as details, with the outer joint part 32 shown in a longitudinal section and the ball cage in a plan view with its axis extending perpendicularly relative to the drawing plane. The outer joint part 32 shown here deviates from that illustrated in FIG. 1 in that it includes an inner spherical face 46 which, if viewed from the aperture 38, is not undercut-free and which prevents the ball cage 34 from being introduced coaxially as a result of drawn-in portions 55 at the outer joint part 32 which reduce the cross-section. In consequence, the ball cage 34, in its position as illustrated, has to be inserted into the outer joint part in the direction of the arrow, with the drawn-in portion 55 having to enter a cage window 42.

FIG. 7 shows the parts illustrated in FIG. 6 in an advanced stage of assembly. In this context it has to be mentioned that, in spite of the slight reductions in diameter at the ball cage 34, which occur as a result of the existing cage windows 42, the free cross-section of the aperture 38 is too small to introduce the ball cage 34 linearly along the axis of the outer joint part 32. This means that the cage 34 has to be rolled into the outer joint part 32 while slightly offsetting its axis relative to the longitudinal axis of the outer joint part, with a drawn-in portion 55, on one side, engaging the associated cage window 42. It is thus necessary for the ball cage 34 to carry out a slight rotational movement around its longitudinal axis which, at the same time, pivots onto the longitudinal axis of the outer joint part 32.

FIG. 8 shows how the unit including the outer joint part 32 and the ball cage 34 is moved into a coaxial position substantially as specified, by pivoting the cage axis around 90°. At the same time, the inner joint part 33 is shown as a detail aligned coaxially relative thereto. Because of the design of the ball cage 34, the inner joint part 33, as indicated by the arrow, may be inserted coaxially in a way which simplifies assembly. In its most important details, the cage 34 corresponds to the embodiment as shown in FIG. 3. In particular, it contains the offset centers $M_1$ and $M_2$ of the radii of curvature of the spherical outer face 43 and of the spherical inner face 44 of the ball cage 34 relative to the central plane E defined by the longitudinal center lines $L_m$ of the cage windows 42.

Figure 9:
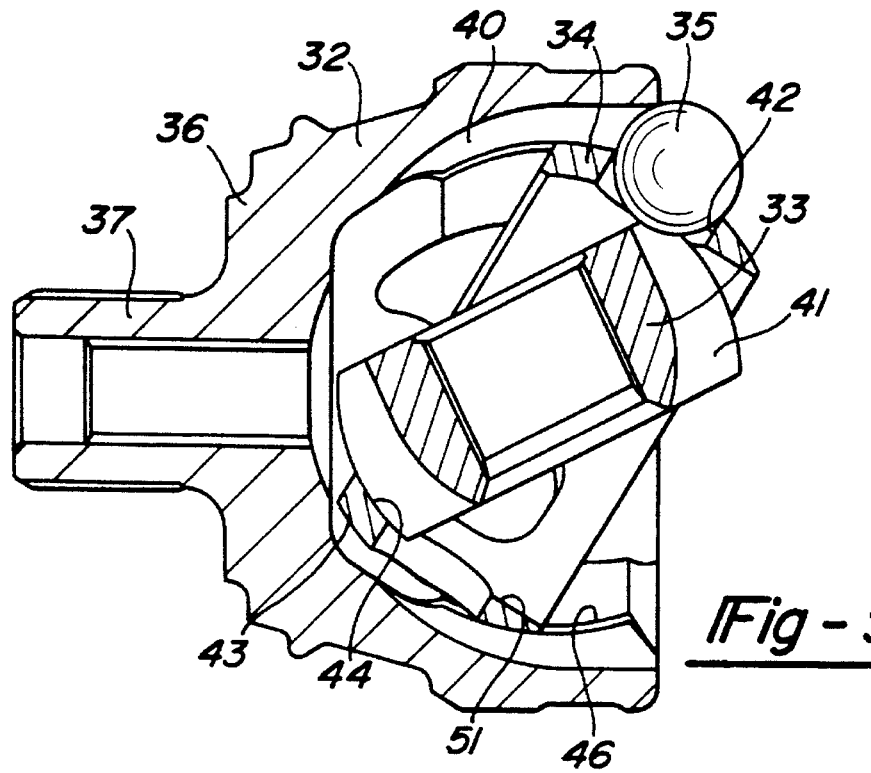
FIG. 9 is a sectional view of a partially assembled joint according to FIG. 5 while the balls are being fitted.

FIG. 9 shows how the unit including the ball cage 34 and the inner joint part 33 is pivoted relative to the outer joint part 32 to be able to radially introduce a first ball 35 into the cage window 42. This operation is then repeated for each individual ball, with the pivotal movement taking place successively in the longitudinal central planes through the other ball tracks 40, 41. Even when introducing a second ball, the inner joint part 33 necessarily pivots relative to the ball cage 34. In the process, the central plane E of the ball cage 34 assumes the angle-bisecting plane between the intersecting longitudinal axes of the outer joint part 32 and the inner joint part 33. In the case of the embodiment illustrated here and including an inner spherical guiding face 46 in the outer joint part 32, it is not possible to do without this type of assembly.

Figure 10:
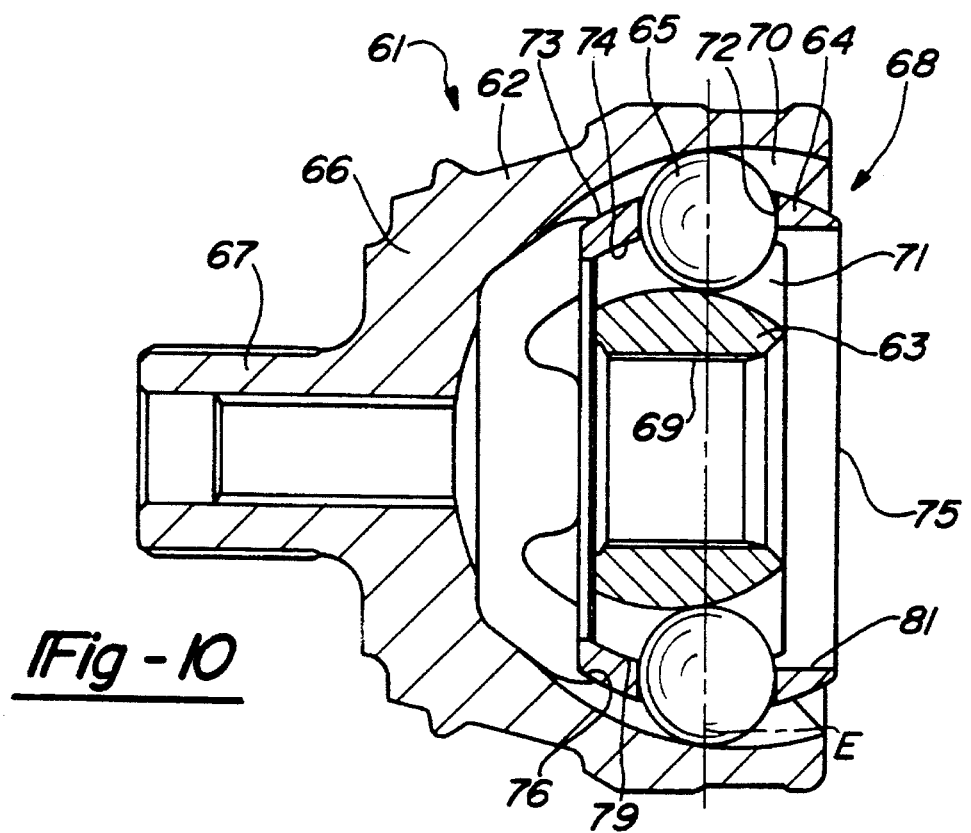
FIG. 10 is a longitudinal section view of a third embodiment of a finish-assembled constant velocity universal ball joint in accordance with the invention (RF joint).

FIG. 10 shows a RF constant velocity universal ball joint 61 which, apart from the shape of the ball tracks, substantially corresponds to that shown in FIG. 5. It includes an outer joint part 62, an inner joint part 63, a ball cage 64 arranged in an annular space (without a reference number) between the two joint parts, and a plurality of circumferentially distributed balls 65. On one side, the outer joint part 62 is closed in a dish-like way by a base 66 which is followed by a hollow journal 67. An aperture 68 is at the drive end of the outer joint part 62. The inner joint part 63 includes a toothed plug-in aperture 69 for a shaft journal. The outer joint part 62 includes first ball tracks 70 which, with reference to the central plane E, are curved in both directions. The inner joint part includes second ball tracks 71 which again, with reference to the central plane E, are axially curved in both directions.

Each pair of radially opposed first and second ball tracks 70, 71 receives a torque transmitting ball 65. The balls 65 are each axially held in a cage window 72 of the ball cage 64. The ball cage 64 includes an outer spherical cage face 73, which is in contact with the outer joint part 62, and an inner spherical cage face 74 which is in contact with the inner joint part 63. The diameter of the inner aperture 75 of the ball cage 64 positioned towards the drive end of the inner joint part 63 is greater than/equal to the greatest diameter of the inner joint part 63. In both axial directions, the ball cage 64 is supported on a spherical guiding face 76 in the outer joint part which is asymmetrically offset relative to the central plane E of the ball cage 64 through the ball centers towards the aperture 68. The ball cage 64 includes an inner spherical ball face 74 against which the inner joint part 73 is supported. At least from the central plane E of the ball cage 64, the inner cage face, if viewed from the drive end of the inner joint part 63, is undercut-free. The undercut-free inner cylindrical portion on the inside of the ball cage 64 has been given the reference number 81.

Figure 11:
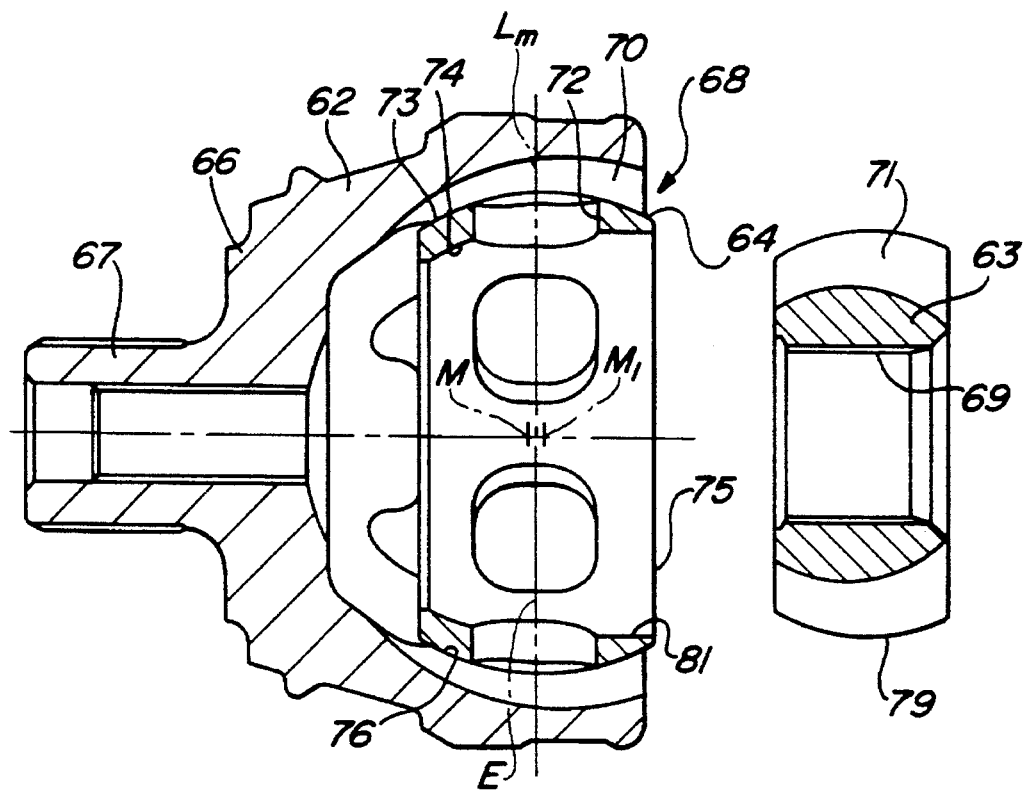
FIG. 11 is a partially exploded sectional view of a pre-assembled unit including the outer joint part and ball cage as well as an inner joint part of a joint according to FIG. 10 prior to assembly.
Figure 12:
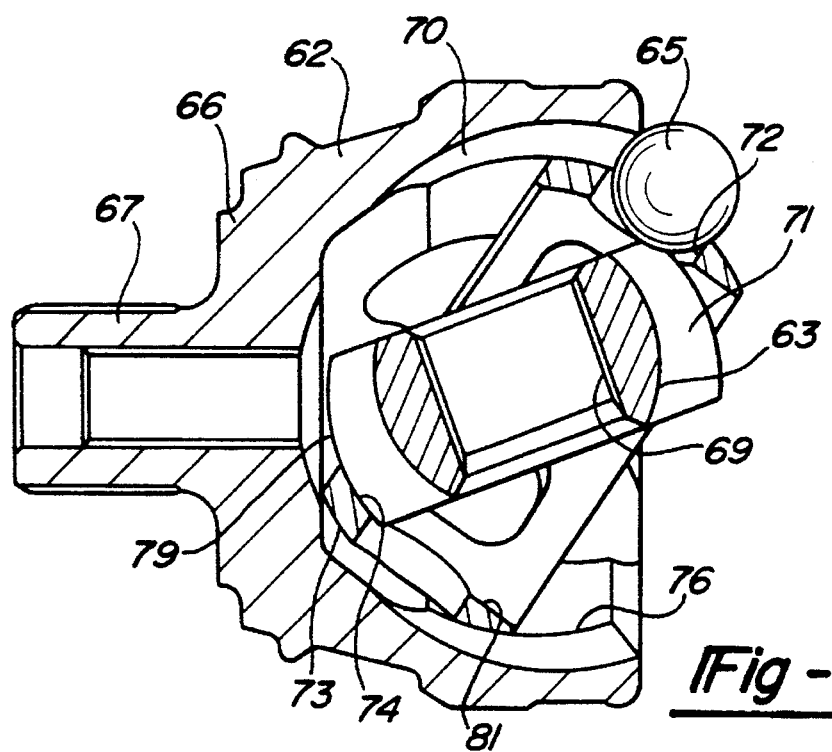
FIG. 12 is a sectional view of a partially assembled joint according to FIG. 10 while the balls are being fitted.

In FIGS. 11 and 12, any details corresponding to those shown in FIG. 10 have been given the same reference numbers. Unless they are mentioned individually, reference is made to the description of FIG. 10.

FIG. 11 shows the outer joint part 62 and the ball cage 64 in the assembled condition, with assembly taking place analogously to the procedure illustrated in, and described with reference to, FIG. 7, with the results being the same as those mentioned in connection with FIG. 8. The unit, including the outer joint part 62 and the ball cage 64, has been moved into a coaxial position substantially as specified. Next to the unit, the inner joint part 63 is shown as a detail coaxially aligned relative thereto. As a result of the design of the ball cage 64, the inner joint part 63, as indicated by the arrow, may be introduced coaxially which simplifies assembly. The cage 64, as far as its most important details are concerned, corresponds to that shown in FIG. 3. In particular, it contains the offset centers $M_1$ and $M_2$ of the radii of curvature of the spherical outer face 73 and inner face 74 of the ball cage relative to the central plane E defined by the longitudinal center lines $L_m$ of the cage windows 72.

FIG. 12 shows how the unit, which includes the ball cage 64 and the inner joint part 63, is pivoted relative to the outer joint part 62 to be able to radially introduce a first ball 65 into the cage window 72. This operation is repeated for each individual ball, with the pivot movement taking place successively in the longitudinal central planes through the other ball tracks 70, 71. Even when introducing a second ball, the inner joint part 63 necessarily pivots relative to the ball cage 64. In the process, the central plane E of the ball cage 64 assumes the angle-bisecting plane between the intersecting longitudinal axes of the outer joint part 62 and the inner joint part 63. In the case of the embodiment illustrated here and including an inner spherical guiding face 76 in the outer joint part 62, it is not possible to do without this type of assembly.

While the above detailed description describes the preferred embodiment of the present invention, the invention is susceptible to modification, variation, and alteration without deviating from the scope and fair meaning of the subjoined claims.

We claim:

1. A constant velocity universal ball joint comprising:
   an outer joint part with longitudinally extending, internally circumferentially distributed first ball tracks;
   an inner joint part with longitudinally extending, externally circumferentially distributed second ball tracks, with one first ball track and one second ball track each arranged so as to be radially opposed;
   an aperture, on at least one end of said outer joint part, said aperture providing clearance for a drive member connectable to the inner joint part;
   torque transmitting balls each guided in said first and said second ball track;
   an annular ball cage positioned in an annular chamber between the outer joint part and the inner joint part, said cage including circumferentially distributed cage windows each axially holding a respective one of the torque transmitting balls said ball cage holds all the torque transmitting balls in one common plane, and when the axes of the outer joint part and of the inner joint part are articulated, said cage guides said balls onto the angle-bisecting plane of said axes, and said cage includes an outer spherical cage face which is in guiding contact with guiding faces associated with the outer joint part, and an inner spherical cage face which is in guiding contact with a surface of the inner joint part, and centers of curvature of the outer spherical face and of the inner spherical face of the ball cage are axially offset relative to a central cage plane, defined by circumferentially extending center lines of the cage windows, with the center of curvature of the outer spherical face positioned towards the aperture in the outer joint part and the center of curvature of the inner spherical face being positioned towards the end of the outer joint part located axially opposite the aperture, and the inner diameter of the opening of the ball cage, which is closest to the aperture of the outer joint part, is greater than the greatest outer diameter of the surface of the inner joint part, so that the inner joint part can be coaxially assembled with the ball cage.

2. A joint according to claim 1, wherein the inner face of the outer joint part, if viewed from the aperture, is axially undercut-free, and said guiding faces include a first guiding faces for the cage provided therein at the end located opposite the aperture and second guiding faces for the cage at the end located towards the aperture are defined by one or more separate securing elements connected to the outer joint part.

3. A joint according to claim 2 wherein the inner face of the outer joint part and the guiding faces of the securing elements which come into contact with the cage have a radius of curvature which is greater than or equal to the radius of curvature of the outer cage face of the cage.

4. A joint according to claim 2 wherein the axially undercut-free inner face of the outer joint part extends cylindrically approximately from the central plane of the cage of the assembled joint when aligned towards the aperture.

5. A joint according to claim 2 wherein the axially undercut-free inner face of the outer joint part extends conically approximately from the central plane of the cage of the assembled joint when aligned towards the aperture.

6. A joint according to claim 2 wherein said drive means includes a driveshaft formed onto the inner joint part so as to be integral therewith.

7. A joint according to claim 2 wherein the cage windows have a desired circumferential length.

8. A joint according to claim 1, wherein the inner face of the outer joint part, if viewed from the aperture, is axially undercut-free and is at a distance from the outer cage face at the end located opposite the aperture, with the balls being in contact with the first and second ball tracks and said cage windows, and second guiding faces for the cage at the end located towards the aperture, are defined by one or more separate securing elements connected to the outer joint part.

9. A joint according to claim 8 wherein the inner face of the outer joint part and the guiding faces of the securing elements which come into contact with the cage have a radius of curvature which is greater than or equal to the radius of curvature of the outer cage face of the cage.

10. A joint according to claim 8 wherein the axially undercut-free inner face of the outer joint part extends cylindrically approximately from the central plane of the cage of the assembled joint when aligned towards the aperture.

11. A joint according to claim 8 wherein the axially undercut-free inner face of the outer joint part extends conically approximately from the central plane of the cage of the assembled joint when aligned towards the aperture.

12. A joint according to claim 8 wherein said drive means includes a driveshaft formed onto the inner joint part so as to be integral therewith.

13. A joint according to claim 8 wherein the cage windows have a desired circumferential length.

* * * * *